(12) United States Patent
Chu

(10) Patent No.: US 6,962,438 B2
(45) Date of Patent: Nov. 8, 2005

(54) TEMPERATURE SENSOR TEMPERATURE SENSING TUBE

(76) Inventor: Kuan-Yu Chu, No. 63, Ta-De 1st Road, Kangshan Town, Kaohsiung Hsien (TW)

( * ) Notice: Subject to any disclaimer, the term of this patent is extended or adjusted under 35 U.S.C. 154(b) by 0 days.

(21) Appl. No.: 10/774,430

(22) Filed: Feb. 10, 2004

(65) Prior Publication Data
US 2005/0175067 A1 Aug. 11, 2005

(51) Int. Cl.$^7$ .............................................. G01K 1/08
(52) U.S. Cl. ................................. 374/208; 73/866.5
(58) Field of Search ......................... 374/208, 139, 374/140, 141; 73/866.5

(56) References Cited

U.S. PATENT DOCUMENTS

| | | | | |
|---|---|---|---|---|
| 3,222,299 A | * | 12/1965 | MacDowell | ............... 521/48.5 |
| 5,675,118 A | * | 10/1997 | Kortvelyessy | ............... 136/234 |
| 5,753,835 A | * | 5/1998 | Gustin | ............... 73/866.5 |
| 5,949,000 A | * | 9/1999 | Lindholm et al. | ........ 73/864.91 |
| 6,485,175 B1 | * | 11/2002 | Nimberger et al. | ......... 374/142 |
| 6,619,837 B2 | * | 9/2003 | Walls et al. | ................ 374/158 |

* cited by examiner

*Primary Examiner*—Gail Verbitsky
(74) *Attorney, Agent, or Firm*—Bacon & Thomas

(57) ABSTRACT

A temperature sensor temperature sensing tube comprised of a head section having an outer conoidal hem formed along the circumference at its lower extent, a neck section formed at the center, a passage disposed in the neck section, and a tube member having a hollow interior section that is contiguous with the passage and an aperture in its bottom section. The head section and the tube member are forged from a tubular blank into a one-piece, entirely unitary structural component, with the head section outer conoidal hem and neck section formed as extensions of the tube member.

4 Claims, 4 Drawing Sheets

TEMPERATURE SENSOR TEMPERATURE SENSING TUBE

BACKGROUND OF THE INVENTION

1) Field of the Invention

The invention herein relates to devices that measure temperature, specifically a temperature sensor temperature sensing tube having exceptional sealing characteristics and that provides for one-piece forged completion.

2) Description of the Related Art

Most mechanical or electronic equipment have sources of heat and are often equipped with temperature sensors to monitor changes in temperature for effecting appropriate control in products such as automobiles, stoves, water heaters, and air conditioners. As indicated in FIG. 1, a conventional temperature sensor consists of external threads 11 died along the outside, a seat 12 of a carrier mount 1, internal threads 13 tapped along the interior of a receiving recess 14, an opening 15 formed in the receiving recess 14, an annular flange 16 protruding inward between the receiving recess 14 and the opening 15; a threaded pin component 2 having a turning section 21 and external threads 22, with a bore 23 inside; a flat shaped retaining section 24 on the end portion of the threaded pin component 2; a temperature sensing tube 3 consisting of a head section 31 and a tube member 32, wherein a bottom base 33 is formed at the lower extent of the head section 31, a flat circular surface 34 is formed at the upper extent, a neck section 35 formed above it, and a passage 36 is disposed in the neck section 35; the hollow interior section of the tube member 32 is contiguous with the said passage 36 and there is an aperture 37 in the bottom section.

In such temperature sensors, the temperature sensing tube 3 is placed into the carrier mount 1 receiving recess 14, enabling the tube member 32 to extend through the opening 15 such that the bottom base 33 is against the carrier mount 1 annular flange 16, and then the threaded pin component 2 retaining section 24 is fastened tightly against the temperature sensing tube 3 circular surface 34; utilization consists of filling the interior section of the temperature sensing tube 3 with a temperature sensing liquid and connecting wires from the temperature sensing tube 3 neck section 35 to a thermometer; when the entire temperature sensor is installed such that the temperature sensing tube 3 is exposed to a heat source, the reaction of the temperature sensing liquid inside the temperature sensing tube 3 is transferred via the wiring to the thermometer and indicated (since the temperature sensing liquid, wiring, and thermometer are not included in the invention herein, they are not shown in the drawings).

Wherein, the said temperature sensing tube 3 typically involves, as indicated in FIG. 2, first fabricating the head section 31 into a single structural component on an automatic lathe and then turning the tube member 32 on an automatic lathe from a solid rod into a single structural component, following which the two are welded into one piece; as such, the structure not only consumes time and effort, but results in higher cost and lower production efficiency, while the welding seam sealing integrity affects dimensional precision and temperature sensing performance.

SUMMARY OF THE INVENTION

The objective of the invention herein is to provide a temperature sensor temperature sensing tube comprised of a head section having an outer conoidal hem formed along the circumference at its lower extent, a neck section formed at the center, a passage disposed in the neck section, and a tube member having a hollow interior section that is contiguous with the said passage and an aperture in its bottom section; the head section and the tube member are forged from a tubular blank into a one-piece, entirely unitary structural component, with the head section outer conoidal hem and neck section formed as extensions of the tube member.

BRIEF DESCRIPTION OF THE DRAWINGS

Other features and advantages of the present invention will become apparent in the following detailed description of the preferred embodiments, with reference to the accompanying drawings, in which.

DETAILED DESCRIPTION OF THE PREFERRED EMBODIMENTS

Figure 1:
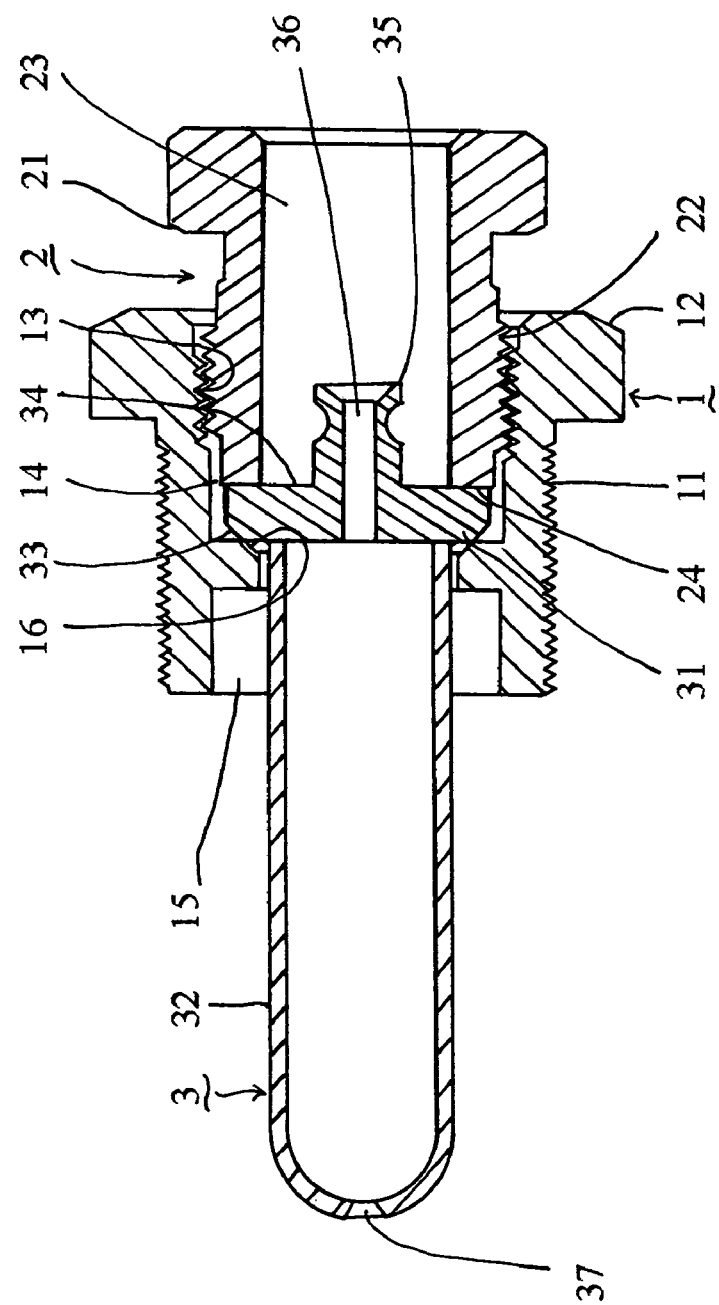
FIG. 1 is a cross-sectional drawing of a conventional temperature sensor structure.
Figure 2:
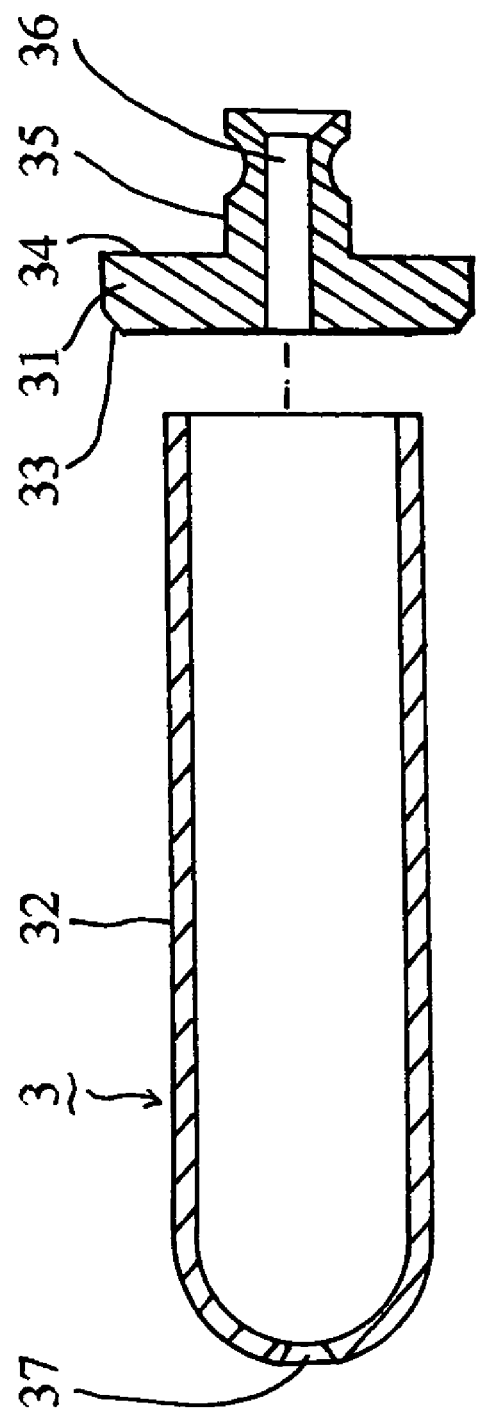
FIG. 2 is a cross-sectional drawing of a conventional temperature sensing tube structure.

In the detailed description of the preferred embodiments, it should be noted that similar elements are indicated by the same reference numerals throughout the disclosure.

Figure 3:
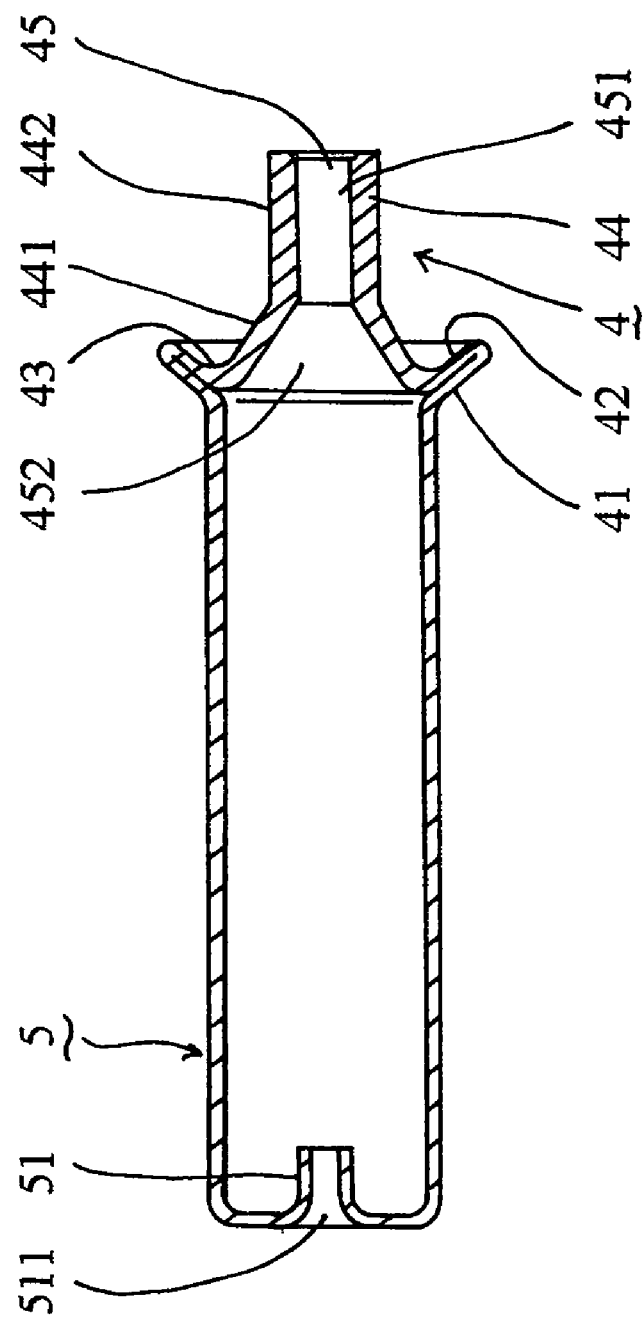
FIG. 3 is a cross-sectional drawing of the preferred embodiment temperature sensing tube structure of the invention herein.

Referring to FIG. 3, the preferred embodiment temperature sensing tube of the invention herein is comprised of:

A head section 4 having an outer conoidal hem 41 and an inner conoidal hem 42 formed along the circumference at its lower extent, wherein the inner conoidal hem 42 is fashioned by acutely bending the upper circumferential edge of the outer conoidal hem 41 into a U-shape such that it overlaps against the outer conoidal hem 41; wherein, a neck section 44 is formed at the bottom section 43 and center of the conoidal hem 42 that includes a gradually reduced neck base 441 which is larger than and formed upward from the bottom section 43 and continues extending above into a neck body 442 having an approximately equal tubular diameter, a passage 45 is disposed in the neck section 44, the said passage 45 including a hole section 451 of a nominally constant inner diameter that matches the neck body 442 and a conic hole section 452 of graduated reduction from the bottom towards the top that matches the neck base 441.

A tube member 5 having a hollow interior section that is contiguous with the said passage 45 and a hole mount 51 formed inward at the bottom section, with an aperture 511 disposed in the hole mount 51.

Since the head section 4 and the tube member 5 are forged from a tubular blank into a one-piece, entirely unitary structural component, no welding is involved in the conjoinment of the head section 4 and the tube member 5 into a single structural entity.

Figure 4:
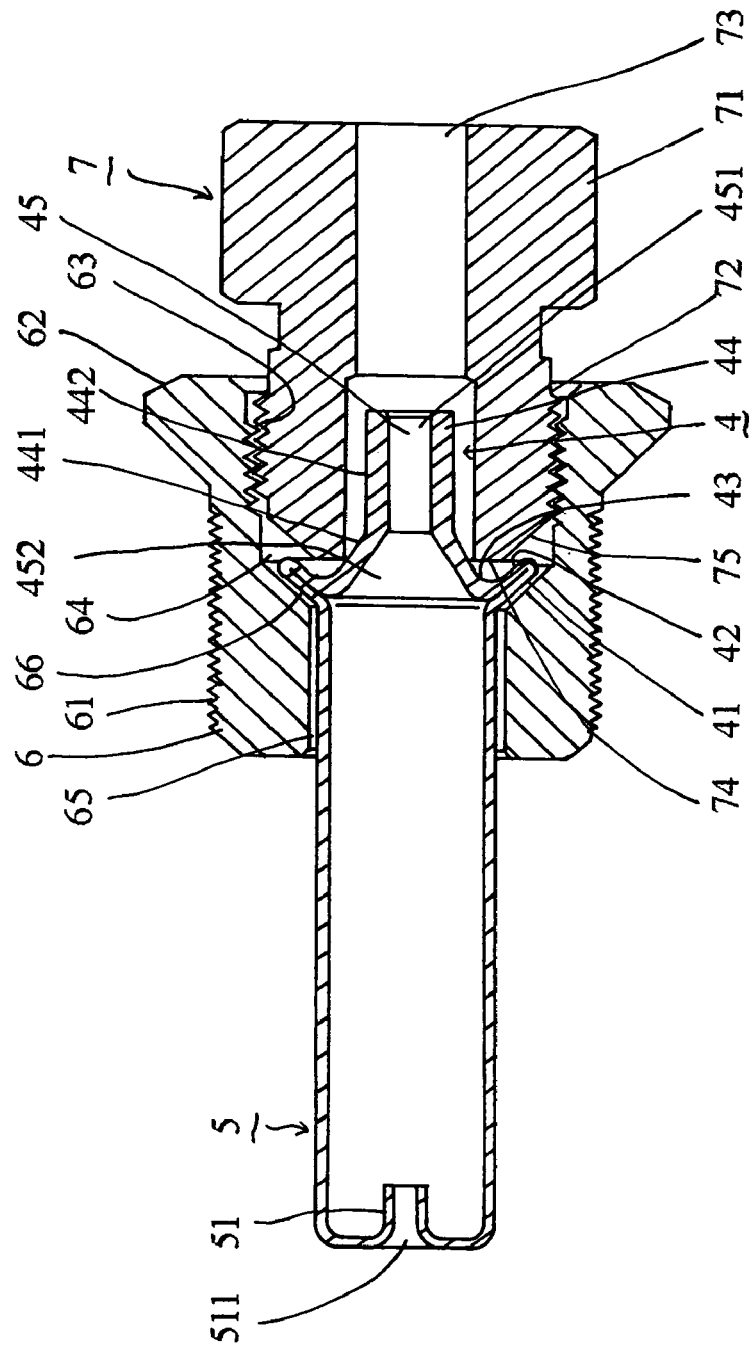
FIG. 4 is a cross-sectional drawing of the preferred embodiment of the invention herein utilized on a temperature sensor structure.

Referring to FIG. 4, in the preferred embodiment temperature sensor temperature sensing tube of the invention herein, the present invention is equipped with a carrier mount 6 and a threaded pin component 7.

The said carrier mount 6 has external threads 61 and a seat 62 as well as a receiving recess 64 inside tapped with internal threads 63; an opening 65 is formed in the receiving recess 64 and a conoidal guide edge 66 is disposed between the receiving recess 64 and the opening 65.

The said threaded pin component 7 has a turning section 71 and external threads 72, with a bore 73 formed inside; the end portion of the threaded pin component 7 is shaped such that it has a flat bottom section 74 and a beveled edge 75.

When the preferred embodiment of the invention herein is utilized on a temperature sensor, the temperature sensing tube is fitted into the carrier mount 6 receiving recess 64, causing the tube member 5 to extend through the opening 65 such that the outer conoidal hem 41 contacts the carrier mount 6 conoidal guide edge 66 and the threaded pin component 7 bottom section 74 is fastened against the temperature sensor bottom section 43, while the threaded pin component 7 beveled edge 75 is secured against the temperature sensing tube conoidal hem 42 to create a tight seal; during utilization, the temperature sensing tube is filled with a temperature sensing liquid and wiring from the temperature sensing tube neck section 44 is connected to a thermometer; when the entire temperature sensor is installed such that the temperature sensing tube contacts a heat source, the reaction of the temperature sensing liquid inside the temperature sensing tube is transferred via the wiring to the thermometer and indicated (since the temperature sensing liquid, wiring, and thermometer are not included in the invention herein, they are not shown in the drawings).

The preferred embodiment of the invention herein provides a design in which the head section 4 has the inner conoidal hem 42 at its lower extent that is extended from the tube member 5 to form the outer conoidal hem 41, and then bending the upper circumferential edge of the outer conoidal hem 41 into a U-shape such that it overlaps against the outer conoidal hem 41, following which a neck section 44 is formed from the bottom section 43 that is larger than the bottom section 43, with a gradually reduced neck base 441 articulated upward and continuing to extend above into the neck body 442; such a design not only enables the forming of the temperature sensing tube as a one-piece structure to save production process time and effort as well as lowering costs and increasing production efficiency, but also reduces welding seam sealing that influences dimensional precision and temperature sensing performance; at the same time, when the threaded pin component 7 is tightly fastened against the temperature sensing tube, the beveled edge 75 and the conoidal hem 42 are in a conically nested state, the threaded pin component 7 fastened to the temperature sensing tube and sealing the opening 65 of the carrier mount 6 receiving recess 64 with exceptionally fine efficiency and excellent sealing to further benefit temperature sensing tube reaction accuracy during temperature measurements.

While the present invention has been described in relation to what is considered the most practical and preferred embodiments, it is understood that the invention herein is not limited to the disclosed embodiments, but is intended to cover various arrangements included within the spirit and scope of the broadest interpretations and equivalent arrangements.

What is claimed is:

1. A temperature sensor temperature sensing tube comprised of:
    a head section having an outer conoidal hem formed along the circumference at its lower extent, a neck section is formed at the center of the tube, and a passage is disposed in the said neck section;
    a tube member having a hollow interior section that is contiguous with the said passage and an aperture in its bottom section;
    wherein, the temperature sensing tube characterized in that said head section and said tube member are forged from a tubular blank into a one-piece, entirely unitary structural component, said head section outer conoidal hem and neck section are formed as extensions of said tube member; and
    wherein said head section is extended from said tube member to form said outer conoidal hem, the upper circumferential edge of said outer conoidal hem is bent into a U-shape such that it overlaps against said outer conoical hem along an inner conoidal hem, following which said neck section is formed from bottom section.

2. The temperature sensing tube according to claim 1 wherein, said neck section includes a gradually reduced neck base which is larger than and formed upward from said bottom section and continues extending above into a neck body having an approximately equal tubular diameter.

3. The temperature sensing tube according to claim 1 wherein, said passage includes a hole section of a nominally constant inner diameter and a conic hole section of graduated reduction from the bottom towards the top.

4. The temperature sensing tube according to claim 1 wherein, said tube member aperture is disposed in a hole mount formed inward at said bottom section.

* * * * *